United States Patent [19]

Platt

[11] Patent Number: 4,926,953
[45] Date of Patent: May 22, 1990

[54] BATTERY HOLD-DOWN STRUCTURE

[76] Inventor: Richard B. Platt, 381 Country Club La., Detroit, Mich. 48236

[21] Appl. No.: 685,769

[22] Filed: Dec. 24, 1984

[51] Int. Cl.$^5$ .............................................. B60R 18/02
[52] U.S. Cl. .................................. 180/68.5; 248/503; 411/384; 411/400; 411/435
[58] Field of Search ........ 180/68.5; 248/503, DIG. 9; 411/435, 384, 383, 400, 338, 339

[56] References Cited

U.S. PATENT DOCUMENTS

| | | | |
|---|---|---|---|
| Re. 25,480 | 11/1963 | Merkle | 180/68.5 |
| 1,882,312 | 10/1932 | Aspinwall | 248/DIG. 9 |
| 2,111,357 | 3/1938 | Cornell, Jr. | 248/DIG. 9 |
| 2,833,363 | 5/1958 | Heneman | 180/68.5 |
| 2,925,137 | 2/1960 | Harper | 180/68.5 |
| 3,581,837 | 6/1971 | Bauschard | 180/68.5 |
| 3,826,115 | 7/1974 | Davis | 180/68.5 |
| 4,310,273 | 1/1982 | Kirrish | 411/338 |
| 4,327,809 | 5/1982 | Fenstermaker | 248/503 |

FOREIGN PATENT DOCUMENTS

| | | | |
|---|---|---|---|
| 2718562 | 11/1978 | Fed. Rep. of Germany | 411/435 |
| 914914 | 11/1946 | France | 411/435 |

*Primary Examiner*—Charles A. Marmor
*Assistant Examiner*—Eric Culbreth

[57] ABSTRACT

Universal battery hold-down structure particularly including an elongated bolt having a J-shaped lower end for securing the bolt to a battery tray and means to facilitate shortening of the bolt, a chrome plated non-corrosive elongated wing nut having a threaded opening in the lower end thereof for receiving the upper end of the bolt and including a dual external diameter forming an annular abutment adjacent the other end thereof for clamping a battery strap over the top of a battery positioned in the battery tray in conjunction with a resilient washer and a polished stainless steel washer sleeved over the non-corrosive wing nut and positioned between the strap end and washer and between the resilient washer and annular abutment. The wing nut includes radially extending wings which facilitate installation of the battery hold-down structure without tools and extends for approximately one quarter of the way down the side of a batteyr thereby to remove the joint between the nut and bolt from the most corrosive battery environment.

19 Claims, 1 Drawing Sheet

BATTERY HOLD-DOWN STRUCTURE

BACKGROUND OF THE INVENTION

1. Field of the Invention

The invention relates to battery hold-down structures and refers more specifically to an elongated bolt including means for securing the elongated bolt to a battery tray at one end thereof and an elongated wing nut which bolt and nut are operable in conjunction with a battery strap to clamp a battery positioned in the tray between the tray and strap. The wing nut is chrome plated or stainless steel, so as to be non-corrosive in a battery environment and extends for a substantial distance below the top of the battery in assembly with the bolt to prevent corrosion of the wing nut and bolt.

2. Description of the Prior Art

In the past, battery hold-down structures have been known which include elongated bolts secured to battery mounting trays and wing nuts which bolts and nuts cooperate with a battery strap extending over the top of the battery to secure the battery in the tray when the wing nuts are assembled on the bolts with the battery strap extending across the top of the battery. Two such battery hold-down structures are shown for example in U.S. Pat. No. 2,925,137 and U.S. Pat. No. 4,327,809.

Such structures of the past have the disadvantage of being unsightly and requiring tools to assemble and disassemble. Even more important these structures of the past have provided wing nuts and bolts made of material which has been subject to corrosion in a battery environment.

Further, such structures of the past have placed the assembly portions, that is, the wing nut threads and bolt threads necessary to the assembly and disassembly of the battery hold-down structure at or very near the top of the battery, adjacent the battery terminals and where corrosive substances are most likely to be, resulting in rapid deterioration of the battery hold-down structure and difficulty in disassembling the structure during battery replacement and the like.

SUMMARY OF THE INVENTION

The invention is a battery hold-down structure in combination with a battery tray having openings in opposite sides thereof adjacent to the bottom of the tray and in combination with a battery strap extending over the top of the battery having holes in the opposite ends thereof. The battery hold-down structure is provided at the opposite sides of the battery tray, is secured to the battery tray and clamps the battery strap on the top of the battery.

In accordance with the invention each battery hold-down structure specifically includes an elongated bolt having one lower end which is open returned to form a J configuration which is threaded over most of its length from the upper, other end thereof and an elongated wing nut having a threaded recess extending axially thereof from one lower end, having a dual diameter to form a radially extending annular abutment in a plain transverse to the plain of extension of the axially extending bolt and radially extending wings facilitating assembly of the wing nut and bolt without tools. The wing nut is chrome plated or stainless steel so as to be non-corrosive in a battery environment and the wing nut is adapted to extend through an opening in an end of the battery strap into engagement with the bolt secured to the battery tray.

The hold-down structure of the invention further includes a resilient washer and a stainless steel washer positioned between the end of the battery hold-down strap and the abutment on the wing nut.

In particular, the invention is directed to the specific bolt and wing nut, the combination of which has a particular utilization in the combination as claimed because of its construction of primarily non-corrosive materials, because it is constructed and arranged to present the connection of the bolt and wing nut away from the corrosive area of a battery environment and because it is provided with means for and is capable of assembly and disassembly without tools.

Further, in accordance with the invention, the elongated bolt and elongated wing nut of the battery hold-down structure facilitate the use of the particular bolt and wing nut of the battery hold-down structure in holding down batteries having different heights. To this end the bolt may be shortened by cutting means and/or may have annular recesses therearound at spaced apart axial locations to aid in the breaking off of predetermined lengths of the bolt as desired to facilitate use of the battery hold-down structure of the invention with different size batteries.

Also, in that parts of the battery hold-down structure are chrome plated or polished stainless steel and are pleasingly proportioned, the battery hold-down structure of the invention is aesthetically improved over the battery hold-down structures of the past.

DESCRIPTION OF THE PREFERRED EMBODIMENT

Figure 1:
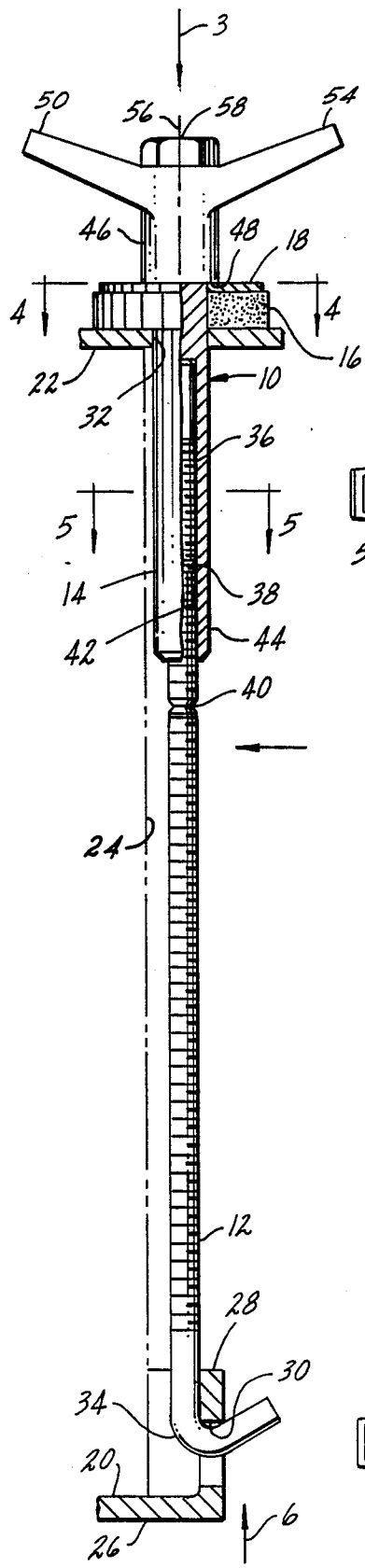
FIG. 1 is a partly broken away elevation view of the battery hold-down structure constructed in accordance with the invention including the unique, elongated bolt and wing nut of the invention in combination with a battery mounting tray and strap and battery.

As shown best in FIG. 1, the battery hold-down structure 10 of the invention includes an elongated bolt 12 and an elongated wing nut 14. A resilient washer 16 and rigid washer 18 are also included as part of the battery hold-down structure of the invention.

The battery hold-down structure 10 of the invention is operable in conjunction with a battery tray 20 and battery strap 22 to clamp a battery 24 to the tray 20.

More specifically, the tray 20 is rectangular, is slightly larger than the battery 24 and is designed to carry the tray 20 on the bottom 26 as shown in FIG. 1.

The tray 20 has at least two opposing short sides 28 having openings 30 extending therethrough.

In use, the tray 20 receives the battery 24 and bolts 12 of battery hold-down structures 10 are secured to the tray 20 through openings 30 on opposite sides of the tray as shown best in FIG. 1.

The battery hold-down strap 22 may be flat and extends across the top of the battery 24. In a normal embodiment the strap 22 may be for example one or two inches wide. The strap 22 has openings 32 in the opposite ends thereof. In use, the strap 22 extends across the top of the battery 24 and the battery 24 is held between the strap 22 and the bottom 26 of the tray 20 by means of battery hold-down structures 10 secured to the tray 20 and extending through the openings in the opposite ends 32 of the strap 22 at opposite sides of the battery 24.

Figure 2:
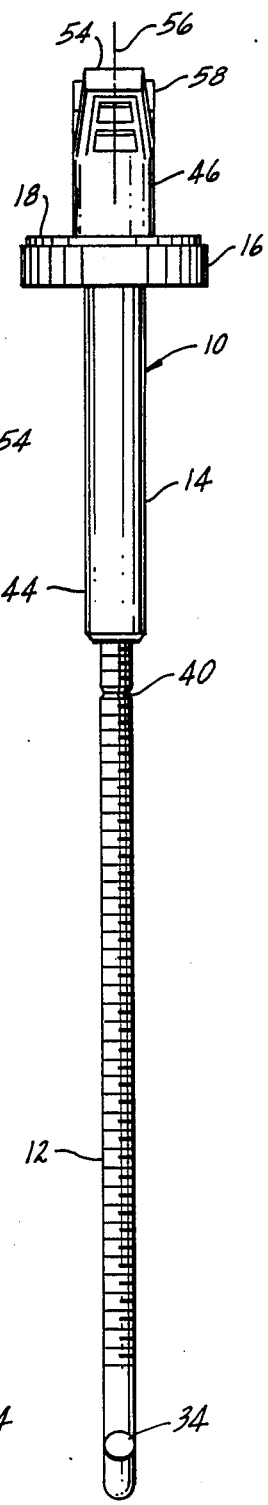
FIG. 2 is an elevation view of the battery hold-down structure illustrated in FIG. 1 taken in the direction of arrow 2 in FIG. 1 without the battery mounting tray, strap and battery.

The bolt 12 of the battery hold-down structure 10 as shown best in FIGS. 1 and 2 is elongated. The lower end 34 of the bolt 12 is open returned in a J configuration as shown best in FIG. 1. The upper end 36 of the bolt 12 is threaded. The threads on the upper end of the bolt 12 extend over substantially three quarters of the bolt 12 from the upper end toward the lower end thereof.

The bolt 12 may be cut off as by means of bolt cutters or a hacksaw to permit use of the battery hold-down structure 10 with batteries 24 having different heights. Alternatively, the bolt 12 may be provided with annular grooves 38 and 40 extending therearound in axially spaced relation from each other on the end 36 of the bolt 12 to aid in the shortening of the bolt 12 when desired. The battery hold-down structure 10 is thus substantially universal with regard to the height of battery 24 which can be held down by the battery hold-down structure 10.

Bolt 12 may be constructed of steel. A zinc plating may be applied to the steel bolt to inhibit corrosion and improve appearance.

Figure 3:
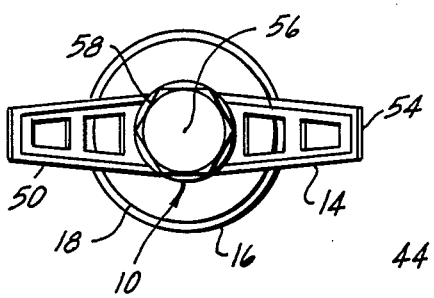
FIG. 3 is a top view of the battery hold-down structure shown in FIG. 2 taken in the direction of arrow 3 in FIG. 1.
Figure 4:
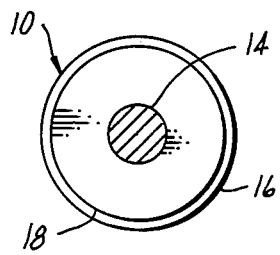
FIG. 4 is a cross section of the battery hold-down structure shown in FIG. 2 taken substantially on the line 4—4 in FIG. 1.
Figure 5:
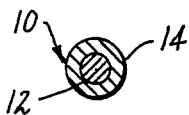
FIG. 5 is a cross section of the battery hold-down structure shown in FIG. 2 taken substantially on the line 5—5 in FIG. 1.
Figure 6:
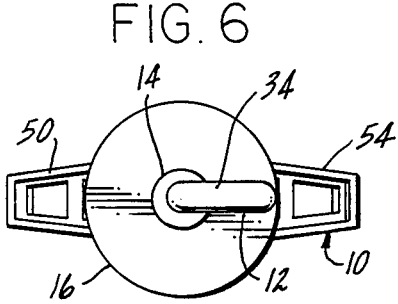
FIG. 6 is a bottom view of the battery hold-down structure illustrated in FIG. 2 taken in the direction of arrow 6 in FIG. 2.

The wing nut 14 as shown best in FIGS. 1-3 is elongated and is provided with a threaded recess 42 extending axially thereof from the end 44 on axis 56. The wing nut 14 is cylindrical and has a dual diameter. That is to say, the external diameter of the lower end 44 of the bolt 14 is smaller than the diameter of the upper end 46. The dual diameter of the wing nut 14 thus provides an annular flat abutment on the wing nut 14 which is radially extending in a plane perpendicular to the axis of extent of the wing nut 14.

Two projections or wings 50 and 54 are provided on the wing nut 14 and extend radially outwardly therefrom. The wings 50 and 54 are separated from each other angularly about the axis 56 of the wing nut 14 by 180°. Wings 50 and 54 are approximately one and one half inches in extent from the axis 56 whereby the wing nut 14 is provided with a handle to permit rotation thereof about the axis 56 to permit easy assembly or disassembly of the wing nut 14 on the bolt 12 without the use of tools.

The wing nut 14 further includes a projection 58 on the top thereof. Projection 58 is hexagonal in top view as shown best in FIG. 3. While projection 58 could be used with a socket or other tools, it is intended for unforeseeen emergencies only. Primarily, the projection 58 on the wing nut 14 is for appearance.

Wing nut 14 may be constructed of steel. Wing nut 14 is chrome plated so that it is non-corrosive in a battery environment.

As shown in FIG. 1, the wing nut 14 extends for a substantial distance between the top of the battery 24 in assembly with strap 22 and the bolt 12 to hold the battery 24 on the battery tray 20. That is to say, the nut 14 extends for about a quarter of the way between the top and bottom of the battery from the top toward the bottom thereof. Thus, the exposed joint between the non-corrosive wing nut 14 and bolt 12 of the battery hold-down structure 10 is positioned substantially below the top of the battery 22 and away from the most corrosive battery environment, that is, away from the top of the battery 24 and particularly away from the terminals of the battery 24.

Battery hold-down structure 10 further includes a resilient washer 16 which may be for example constructed of black chemical resistant rubber and a rigid washer 18 which is polished stainless steel. As shown, the resilient washer 16 is positioned between the end of the battery strap 22 and the rigid washer 18 while the rigid washer 18 is positioned between the resilient washer 16 and the annular abutment 48 formed on the wing nut 14.

In use, with a battery 24 positioned in the tray 20 and with the battery strap 22 passed across the top of the battery 24 again as shown in FIG. 1, a separate battery hold-down structure 10 is secured in position as shown in FIG. 1 on opposite sides of the battery 24. That is to say, the J-shaped end 34 of the bolt 12 is passed through the opening 30 in the tray 20, the rigid washer 18 is first sleeved over the end 34 of the wing nut 14 followed by the resilient washer 16. The end 44 of the wing nut 14 is then passed through the opening 22 in the end of the strap 22 and is secured to the bolt 12 by rotation of the wing nut 14 by means of grasping the wings 50 and 54 with a hand.

It will be understood that prior to the assembly of the hold-down structure 10 that the battery height 24 has been considered and the bolt 12 shortened to permit clamping of the battery 24 between the battery strap 22 and the bottom 26 of the battery tray 20 with the battery hold-down structure 10 assembled as indicated above.

When it is desired to remove the battery 24 for replacement, service or the like, it is only necessary to again grasp the wing nut 14 by the wings 50 and 54 and remove the nut 14 by rotation thereof about the axis 56. Again, due to the size of the wings 50 and 54, no external tools are necessary.

Further, in accordance with the invention, since in particular the wing nut 14 is chrome plated and the washer 18 is stainless steel and thus resist corrosion due to a battery environment and the like and because the wing nut 14 extends for a substantial distance below the top of the battery 24 as for example a quarter of the way down the battery and the connection between the bolt 12 and wing nut 14 is thus out of the corrosive zone of the battery, the battery hold-down structure 10 will not deteriorate as quickly as previous battery hold-down structures, not having the features of the invention detailed above. The battery hold-down structure 10 of the invention will thus provide a substantially extended life as compared to the usual battery hold-down structures pointed out above. Further, the battery hold-down structures 10 will more readily permit assembly and disassembly thereof during the life of the battery hold-down structures without tools and will be aesthetically pleasing.

While one embodiment of the invention has been considered in detail, it will be understood that other embodiments and modifications of the invention are contemplated. Thus for example, there may be three or more wings on the wing nut if desired. Also, in some installations one bolt may be held in a hole in an automobile part such as a fender. It is the intention to include all such embodiments and modifications of the invention as are defined by the appended claims within the scope of the invention.

I claim:

1. In combination with a battery for a vehicle, a battery tray in which the battery is positioned, a battery strap having openings in the ends thereof positioned over the top of the battery and battery hold-down structure on opposite sides of the battery, each battery hold-down structure including an elongated bolt having a length slightly less than the height of the battery which bolt is threaded over at least one-fourth of its length from one end toward the other end thereof and which bolt includes means at the other end thereof for securing the other end of the bolt to the battery tray and an elongated nut having a length approximately one half as long as the elongated bolt including a smaller diameter portion extending through an opening in an associated end of the battery strap having an internally threaded axially extending recess therein for receiving the one end of the bolt and a larger diameter end providing an annular abutment between the smaller diameter and larger diameter ends for clamping the battery strap to the top of the battery with the nut extending through the opening in the associated end of the battery strap for approximately one-fourth of the height of the battery from the top toward the bottom of the battery and engaged with the one end of the bolt and with the other end of the bolt secured to the tray, and radially extending wings on the larger diameter portion of the nut having a dimension to permit grasping of the wings in the palm of the hand to facilitate threading the nut on or off of the bolt with the battery tray, battery strap and battery hold-down structure in assembly.

2. Structure as set forth in claim 1 wherein the battery tray has opposite sides and slots are provided in the opposite sides and wherein the means for securing the bolt to the battery tray includes a J-shaped other bolt end extending through the slot.

3. Structure as set forth in claim 1 wherein the bolt includes means for facilitating shortening of the bolt whereby the battery hold-down structures may be utilized for holding down batteries having different heights.

4. Structure as set forth in claim 3 wherein the means for facilitating shorthening of the bolts comprises at least one angular groove extending around the bolt in spaced relation to the one end thereof.

5. Structure as set forth in claim 1 wherein the large diameter portion of the nut is approximately half of the length of the smaller diameter portion of the nut.

6. Structure as set forth in claim 1 wherein the nut further includes a polygonal head on the large diameter end thereof and the wings are positioned between the polygonal head and the small diameter end of the nut.

7. Structure as set forth in claim 1 wherein the nut is constructed of material which is noncorrosive in a battery environment.

8. Structure as set forth in claim 1 wherein each hold-down structure further includes washer means positioned between the annular abutment on the bolt of the hold-down structures and the associate end of the battery strap.

9. In combination a vehicle battery a battery tray having opposite sides including slots therein a battery strap extending across the top of the battery between the opposite sides of the battery tray including openings in the opposite ends thereof and battery hold-down structures at each of the opposite sides of the battery tray extending through the openings in the battery strap and engaged with the battery tray for securing the battery to the battery tray, each of which battery hold-down structures comprises an elongated bolt slightly shorter than the height of the battery which bolt is threaded from one end thereof adjacent the top of the battery for substantially the entire length thereof toward the other end of the bolt, the other end of the bolt having a J-configuration and extending through a slot in the associated side of the tray, a resilient washer positioned over the opening in the associated end of the battery strap a rigid chrome plated washer positioned over the resilient washer at the associated end of the battery strap and an elongated nut approximately half of the length of the elongated bolt having a smaller diameter portion over substantially two-thirds of the length thereof including an axially extending recess therein over substantially the entire length of the smaller diameter portion for receiving the one end of the threaded bolt, said nut also having a larger diameter end forming an annular abutment between the larger diameter and smaller diameter ends thereof, a pair of wings extending radially 180 degrees apart from the larger diameter portion of the elongated nut to permit grasping of the wings in the palm of the hand to facilitate threading the bolt on the nut and a polygonal head on the larger diameter end of the nut on the side of the wings opposite the smaller portion of the nut which nut is passed through the washers and through the associated end of the battery strap and is threaded onto the one end of the associated bolt to clamp the battery between the battery tray and battery strap.

10. Battery hold-down structure for facilitating clamping of a battery between a battery tray and a battery strap comprising an elongated bolt slightly shorter than a battery to be held down by the battery hold-down structure which is threaded over at least one-fourth of its length from one end toward the other end thereof and means at the other end of the bolt for securing the bolt to a battery tray and an elongated nut substantially half the length of the elongated bolt having a smaller diameter portion approximately one-third as long as the bolt including an axially extending recess therein over most of its length for receiving the one end of the bolt and a larger diameter portion providing an annular recess between the larger diameter portion and smaller diameter portion.

11. Structure as set forth in claim 10 wherein the other end of the bolt is formed in a J-shape to facilitate securing of the other end of the bolt to the tray.

12. Structure as set forth in claim 10 and further including means intergral with the bolt for facilitating shortening of the bolt.

13. Structure as set forth in claim 12 wherein the means for facilitating shortening of the bolt is at least one angular groove extending around the bolt in spaced relation to the one end thereof.

14. Structure as set forth in claim 10 wherein the smaller diameter portion of the nut is substantially twice as long as the larger diameter portion.

15. Structure as set forth in claim 10 wherein the nut includes a polygonal head on the end of the larger diameter portion and the wings are between the polygonal head and smaller diameter portion of the nut.

16. Structure as set forth in claim 10 wherein the nut is constructed of material which is noncorrosive in a battery environment.

17. Structure as set forth in claim 10 and further including washer means sleeved over the smaller diameter portion of the bolt and abutted against the annular abutment between the smaller diameter and large diameter portion of the bolt.

18. Structure as set forth in claim 17 wherein the washer means includes at least one rigid washer and at least one resilient washer and the rigid washer is between the resilient washer and larger diameter portion of the nut.

19. Structure as set forth in claim 10 and further including wings extending radially outwardly from the larger diameter portion of the nut for facilitating grasping of the wings in the palm of the hand and threading the nut on the bolt.

* * * * *